United States Patent [19]
Gardner et al.

[11] Patent Number: 5,253,876
[45] Date of Patent: Oct. 19, 1993

[54] SYSTEM AND METHOD FOR ACTIVELY COOLING DRY-RUNNING GAS SEALS

[75] Inventors: James F. Gardner, Exeter; John Short, North Scituate; Amitava Datta, East Greenwich, all of R.I.

[73] Assignee: EG&G Sealol, Inc., Providence, R.I.

[21] Appl. No.: 924,793

[22] Filed: Aug. 6, 1992

Related U.S. Application Data

[63] Continuation of Ser. No. 500,560, Mar. 28, 1990, abandoned.

[51] Int. Cl.$^5$ .............................................. F16J 15/34
[52] U.S. Cl. ........................................ 277/15; 277/22; 277/74; 277/81 R
[58] Field of Search ................. 277/1, 3, 15, 16, 22, 277/27, 70, 71, 74, 75, 79, 81 R, 93 R, 93 SD, 96.1

[56] References Cited

U.S. PATENT DOCUMENTS

| | | | |
|---|---|---|---|
| 2,824,759 | 2/1958 | Tracy | 277/22 X |
| 3,079,605 | 2/1963 | Thomas et al. | 277/27 |
| 3,109,658 | 11/1963 | Barrett et al. | |
| 3,184,244 | 5/1965 | Van Vleet | |
| 3,357,706 | 12/1967 | Wilkinson | 277/22 |
| 3,486,760 | 12/1969 | Tracy | 277/74 |
| 3,499,653 | 3/1970 | Gardner | |
| 3,527,465 | 9/1970 | Guinard | |
| 3,704,019 | 11/1972 | McHugh | |
| 3,751,045 | 8/1973 | Lindeboom | |
| 3,776,560 | 12/1973 | Wentworth, Jr. | |
| 3,782,737 | 1/1974 | Ludwig et al. | |
| 3,804,424 | 4/1974 | Gardner | |
| 3,894,741 | 7/1975 | McHugh | |
| 3,905,605 | 9/1975 | Hubner | 277/22 |
| 3,968,969 | 7/1976 | Mayer et al. | 277/74 X |
| 4,099,729 | 7/1978 | Nylykke | |
| 4,114,900 | 9/1978 | Wiese | |
| 4,212,475 | 7/1980 | Sedy | |
| 4,294,453 | 10/1981 | Inouye et al. | 277/22 |
| 4,721,311 | 1/1988 | Kakabaker | 277/22 |
| 4,889,348 | 12/1989 | Amundson et al. | 277/81 R |
| 5,093,113 | 8/1991 | Gardner | 277/81 R |

FOREIGN PATENT DOCUMENTS

| | | |
|---|---|---|
| 312196 | 4/1989 | European Pat. Off. |
| 1450285 | 12/1968 | Fed. Rep. of Germany |
| 3533829A1 | 4/1987 | Fed. Rep. of Germany |
| 2192676 | 2/1974 | France |

OTHER PUBLICATIONS

"Combined Hydrostatic and Hydrodynamic Principles Applied to Non-Contacting Face Seals"; James F. Gardner; May 5, 1969.

"Recent Developments on Non-Contacting Face Seals"; James F. Gardner; Apr. 3, 1973.

*Seals and Sealing Handbook*, 1st Ed., by R. H. Warring, Published by Gulf Publishing Co., Houston, Tex., 1981 pp. 251-253.

*Engineered Fluid Sealing*, 2nd Ed., Published by (John) Crane Packing Co., Morton Groove, Ill. 60053 pp. 50, 166, 167, 234, 235, 282.

*Primary Examiner*—William A. Cuchlinski, Jr.
*Assistant Examiner*—Scott W. Cummings
*Attorney, Agent, or Firm*—Finnegan, Henderson, Farabow, Garrett & Dunner

[57] ABSTRACT

A dry-running gas seal includes a stationery seal ring carrier holding a stationary seal ring, a rotary seal ring carrier holding a rotary seal ring facing the stationary seal ring, scoops radially outside and extending toward the rotary seal ring carrier, and a heat exchanger in fluid communication with the scoops, whereby the portion of the gas is trapped by the scoops and transferred to and cooled by the heat exchanger and returned to and the high pressure area adjacent to the seal.

6 Claims, 3 Drawing Sheets

SYSTEM AND METHOD FOR ACTIVELY COOLING DRY-RUNNING GAS SEALS

This application is a continuation of application Ser. No. 07/500,560 filed Mar. 28, 1990, now abandoned.

BACKGROUND OF THE INVENTION

1. Field of the Invention

The present invention relates to cooling a dry-running gas seal.

2. Description of the Related Art

Dry-running gas seals are a relatively mature technology. One of the initial working concepts of dry-running gas seals was provided in U.S. Pat. No. 3,499,653 to Gardner. Further refinements which have improved the performance of dry-running gas seals are disclosed, for example, in U.S. Pat. Nos. 4,212,475 to Sedy and 4,768,790 to Netzel et al.

Dry-running gas seals offer the advantage of consuming less power than older oil buffered gas seals. However, gas is a rather poor conductor of heat. Thus, although absolute levels of power generated are small, the temperature buildup in the seal cavity of dry-running gas seals can be great. For example, the 3-5 horsepower generated for a seal on a 4 inch shaft operating at 1,000 psig and 16,000 rpm can result in operating temperatures as high as 400° F.

Increased temperature buildup causes reduced "O" ring life and increased differential thermal growth between the seal rings and their carriers.

SUMMARY OF THE INVENTION

The present invention overcomes the problems and disadvantages of the prior art by providing a system for cooling the sealing area. An object of the invention is to provide a reduction in operating temperature in the seal ring components.

Additional objects and advantages of the invention will be set forth in part in the description which follows, and in part will be obvious from the description or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a dry-running gas seal for sealing a high pressure area from a low pressure area, the seal comprising: a stationary seal ring carrier holding a stationary seal ring; a rotary seal ring carrier holding a rotary seal ring facing the stationary seal ring; and circulating means for capturing a portion of the gas surrounding the rotary seal ring carrier, transferring the captured gas to a heat exchanger for cooling and returning the cooled gas to the high pressure area adjacent to the seal.

It is to be understood that both the forgoing general description and the following detailed description are exemplary and explanatory only and are not restrictive of the invention as claimed.

The accompanying drawings which are incorporated in and constitute part of the specification, illustrate one embodiment of the invention and together with the description serve to explain the principles of the invention.

DESCRIPTION OF THE PREFERRED EMBODIMENT

Reference will now be made in detail to the presently preferred embodiment of the invention, an example of which is illustrated in the accompanying drawings. Wherever possible the same reference numbers will be used throughout the drawings to refer to the same or like parts.

Figure 1:
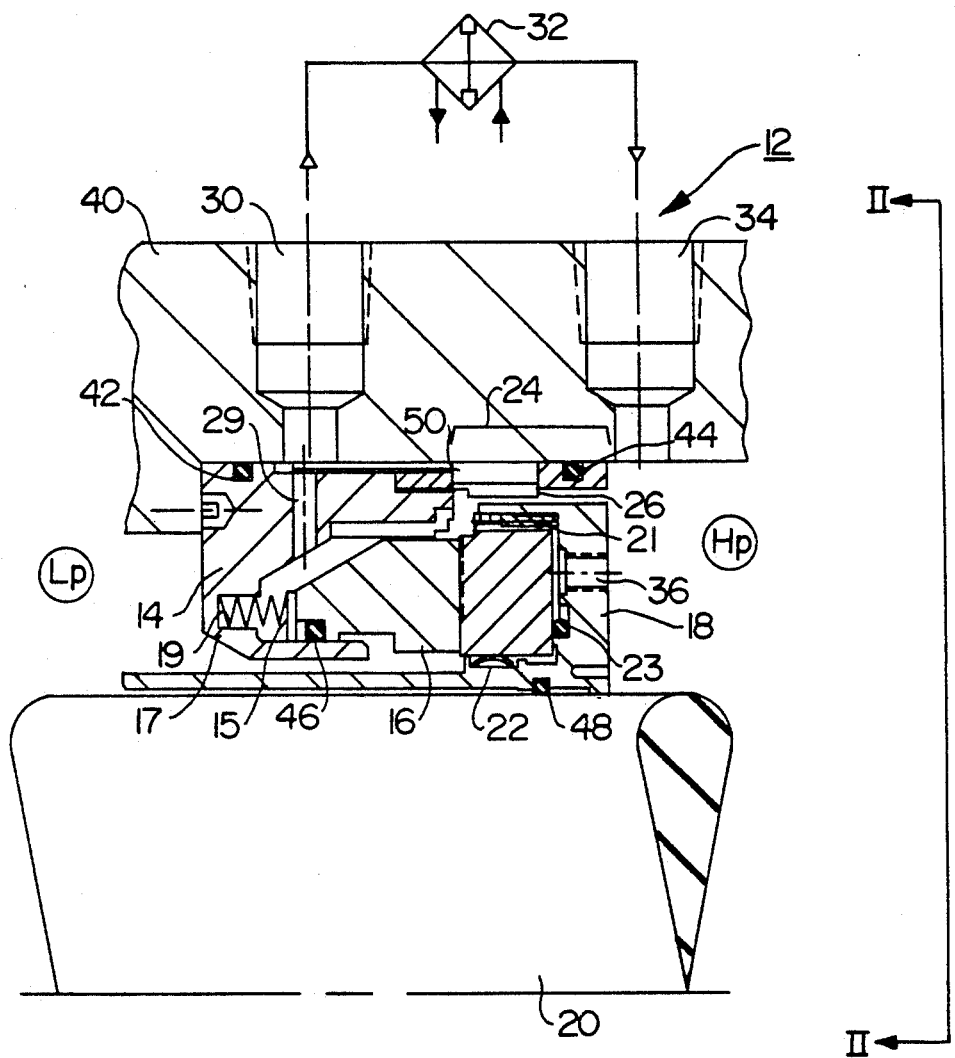
FIG. 1 is a partial cross-sectional view of a dry-running gas seal in accordance with this invention.

FIG. 1 shows a dry-running gas seal 12 of the invention. The seal has stationary seal ring carrier 14 with stationary seal ring 16 mounted therein. Rotary seal ring carrier 18 is mounted on a shaft 20 and holds the rotary seal ring 22 such that it is facing the stationary seal ring. The seal as thus described seals a process gas (indicated by "Hp" in FIG. 1) in fluid communication with the radially outer side of the seal from a low pressure area (indicated as "Lp" in FIG. 1) in fluid communication with the radially inner side of the seal.

The stationary seal ring 16 is preferably made of carbon graphite, although it can be made from other commercially acceptable materials known in the art. Stationary seal ring carrier 14, which holds the stationary seal ring in annular pocket 15, is preferably made of Inconel 625 or stainless steel. The pocket may be formed by turning or other methods well known in the art. A series of holes 17 are bored into the bottom of the pocket. Springs 19 fit into those bore holes and serve to engage the stationary seal ring with the rotary seal ring when the seal is not pressurized.

The stationary seal ring carrier 14 is fixed to a housing 40 by conventional means, for example "O" rings 42 and 44 are positioned at the rear and front of the stationary seal ring carrier and form a seal between the stationary seal ring carrier 14 and housing 40. An "O" ring 46 similarly forms a seal between the stationary seal ring carrier 14 and the seal ring 16. As a result, the primary flow path for any gas leakage is between the faces of stationary seal ring 16 and rotary seal ring 22.

The rotary seal ring 22 is preferably made of silicon carbide, although it can be made from other commercially acceptable materials known in the art. The rotary seal ring is held in the pocket 23 of the rotary seal ring carrier 18 by an annular "L" shaped clip 21 (shown best in FIG. 4) which press fits against the outer portion of the pocket. The rotary seal ring carrier 18 fits over shaft 20 and includes an "O" ring 48 which forms a seal between the shaft and the carrier 18.

In the embodiment shown, the face of the rotary seal ring has spiral grooves formed thereon. The grooves serve to provide both hydrostatic and hydrodynamic forces for separating the sealing faces. When exposed to a pressurized gas, the gas enters the grooves and provides an opening force. That opening force is balanced by the gas pressure acting on the back of the stationary seal ring 16, which pressure tends to close the sealing faces. The grooves preferably have a average groove angle of 5°–15° or 60°–85° and extend from the outer periphery across 50–70% of the sealing face. The inventors have found that the above groove angles and sizing of the grooves provide optimum results.

Figure 3:
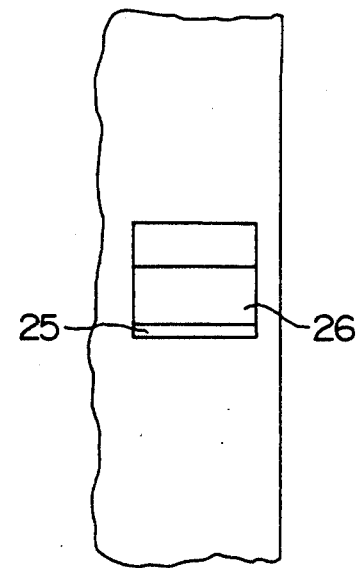
FIG. 3 is a partial view of Section III—III of FIG. 2 showing the stationary seal ring retainer made according to the present invention.

In accordance with the preferred embodiment of the invention, the seal includes circulating means for cooling the gas surrounding the seal. As embodied herein, the circulating means includes an extension 24 of the stationary seal ring carrier 14 which extends the carrier over the rotary seal ring carrier 18. The extension contains a plurality of apertures 25 preferably having flow pickup scoops 26 formed at each aperture, one of which is shown in FIG. 3. The scoops promote the capture of the gas at the apertures. The apertures and scoops are preferably uniformly spaced about the circumference of the extension 24.

As shown in FIG. 1, an annular pocket or recess 50 is formed between the axially intermediate portion of the stationary seal ring carrier 14 and the adjacent inner wall of housing 40. This recess 50 is positioned between "O" rings 42 and 44. The forward or upstream portion of the recess 50 is positioned opposite the outer circumference of the rotary ring carrier 18 and the rotary ring 22. The plurality of apertures 25, which are preferably aligned with the outer surface of the rotary seal ring carrier 18, are in fluid communication with the annular recess 50. Annular recess 50 in turn is in fluid communication with exhaust bore 30 formed in housing 40. Exhaust bore 30 is in fluid communication with heat exchanger 32, which in turn is in fluid communication with return bore 34 formed in the housing 40. Return bore 34 is formed upstream of recess 50 and rotary ring carrier 18. In the preferred embodiment, the return bore 34 is positioned immediately adjacent the rotary carrier 18.

As will be described below, these elements provide a flow path for gas to flow through apertures 25, recess 50, exhaust bore 30, heat exchanger 32 and return bore 34. The relatively hot gas at the interface between the carrier 14 and carrier 18 is cooled and returned to the sealed high pressure area. The heat exchanger may be of conventional design as known in the art, for example, a shell and tube heat exchanger (available commercially from Exergy, Inc. and other sources).

When the seal is operating, the rotary carrier 18 and seal ring 22 rotate at high speeds relative to the housing 40 and stationary seal ring carrier 14 and seal ring 16. This high speed rotation causes the gas at the interface between carrier 18 and carrier 14 to move in the interface. The average velocity of the gas in the clearance between the rotary seal ring retainer and the stationary seal ring retainer extension is approximately one-half the velocity of the outside diameter of the rotating seal ring carrier. This means that for a 6 inch O.D. rotary seal ring retainer rotating at 16,000 rpm with a O.D. circumferential speed of approximately 420 feet per second, a gas velocity of approximately 200 feet per second is created.

The scoops 26 and apertures 25 capture a portion of the dynamic head, i.e., the pressure equivalent of the energy of motion. This dynamic head for a 200 ft. per second velocity with air at 1000 psi produces approximately a 20 psi pressure increase between the recess 50 within the extension 24 and the process gas "Hp". In accordance with the invention, the pressure is sufficient to flow the gas in recess 50 through exhaust bore 30 to a heat exchanger 32 where the gas is cooled and then returned through return bore 34 to a position close to the back of the rotary seal ring retainer.

Furthermore, a circulation of cooling gas to the back of stationary seal ring 16 may be provided by gas flow through orifice 29 formed in carrier 14 and preferably aligned with conduit 30. Orifice 29 causes a portion of the gas that would normally flow from recess 50 through exhaust bore 30 to flow behind the stationary seal ring. Although the gas passing through this orifice has not yet passed through the heat exchanger, a measure of cooling is still provided because the gas in the seal cavity has been cooled by the heat exchanger and is cooler than in a conventional dry-running gas seal.

Figure 2:
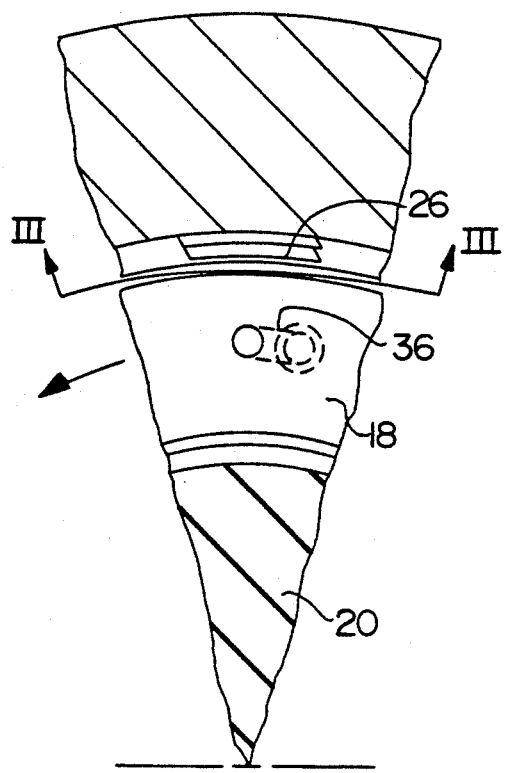
FIG. 2 is a partial cross-sectional view of Section II—II of FIG. 1.
Figure 4:
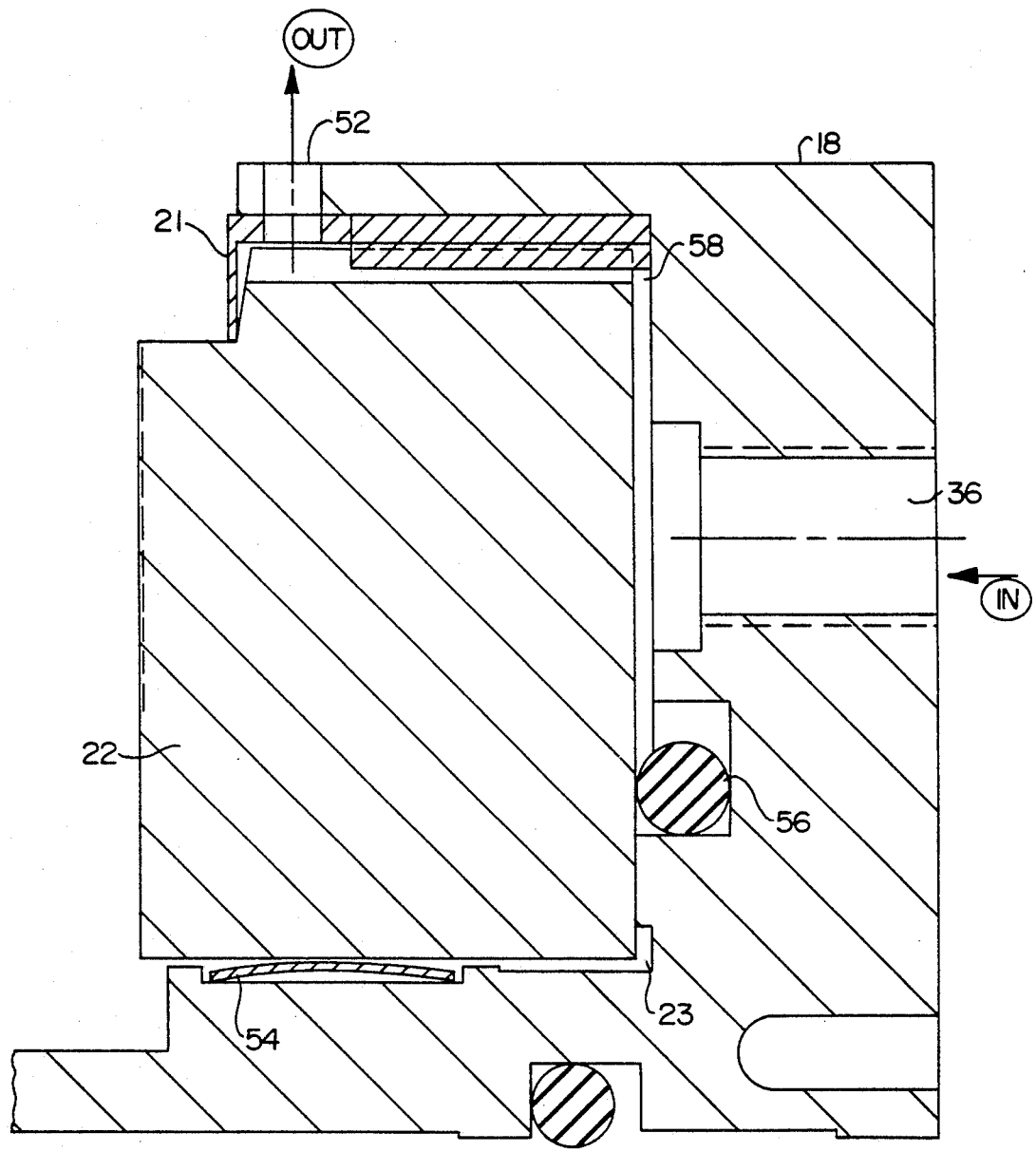
FIG. 4 is a partial cross-section of a rotary seal ring carrier according to the invention.

Preferably, as shown in FIGS. 2 and 4, the rotary seal ring retainer includes a series of holes 36 formed in the back in order to circulate the cooled gas around the rotary seal ring. These holes are slanted toward the direction of rotation at an angle of 35° to 45° from the plane of rotation. This orientation pumps gas into and around the back of the rotary seal ring and out vent holes 52 which are provided in the side of the rotary seal ring carrier. Preferably, 6 to 8 holes 36 are provide which are circular in cross-section with a ¼ to ⅜ inch diameter. As an alternative to the vent holes, vent openings may be provided in the axially orthogonal part of the "L" shaped spring clip 21 which serves, along with finger spring 54, to retain the rotary seal ring 21 in pocket 23. The vent holes allow pocket 23 to have a flow path 58 for the gas because the rotary seal ring is spaced from the seal ring carrier so that flow may enter at holes 36 ("in") and exit at holes 52 ("out") "O" ring 56 prevents the gas entering holes 36 from leaking past the seal.

Other preferred elements of gas seal design, along with an explanation of gas seal theory, is presented in copending application Ser. No; 07/466,656, filed Jan. 17, 1990 and assigned to the same assignee. Copending application Ser. No. 07/466,656 (now U.S. Pat. No. 5,039,113) is explicitly incorporated herein by reference.

Cooling the seal cavity results in increased seal face flatness, improved elastomer life (e.g., "O" ring life) and minimizes the problems associated with differential thermal expansion between the seal rings and their carriers.

In the preferred embodiment shown in the drawings, the apertures 25 and scoops 26 are formed in the stationary carrier. This embodiment is preferred since the system can be adapted to a seal environment by simply placing bores 30 and 34 in the housing at the seal. It should be apparent to those skilled in the art, however, that a plurality of apertures and flow channels could be formed in the housing.

It will be apparent to those skilled the art that other modifications and variations can be made in the seal of the present invention and in the construction of this cooling system without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A dry-running gas seal for sealing a high pressure area from a low pressure area, the seal comprising:

a stationary seal ring carrier holding a stationary seal ring;

a rotary seal ring carrier holding a rotary seal ring facing said stationary seal ring; and circulating means for capturing a portion of the gas surrounding said rotary seal ring carrier and transferring the captured gas to a heat exchanger for cooling and returning the cooled gas to the high pressure area adjacent to the seal, said circulating means including apertures having flow scoops positioned radially outside said rotary seal ring carrier and in fluid communication with the gas surrounding said rotary sea ring carrier, a heat exchanger in fluid communication with said apertures, and a return conduit in fluid communication with said heat exchanger and having a return outlet adjacent to said apertures, whereby the portion of the gas captured by said circulating means is transferred to and cooled by said heat exchanger.

2. A dry-running gas seal as claimed in claim 1 wherein a portion of stationary seal ring extends over at least a portion of said rotary seal ring carrier and said apertures are formed in said stationary seal ring carrier.

3. An active cooling system for a dry-running gas seal of the type having a stationary seal ring, a stationary seal ring carrier attached to a housing, a rotary seal ring and a rotary seal ring carrier, the active cooling system comprising:

an annular extension of the stationary seal ring carrier adapted for extending over but not contacting the rotary seal ring carrier;

a plurality of apertures formed in said annular extension of the stationary seal ring carrier, said apertures including scoops extending from said apertures, said scoops extending toward but not contacting the rotary seal ring carrier;

an exhaust bore formed in the housing, said exhaust bore being in fluid communication with said apertures;

a heat exchanger in fluid communication with said exhaust bore; and a return bore formed in the housing, said return bore being in fluid communication with said heat exchanger and having a return outlet adjacent said apertures.

4. An active cooling system as claimed in claim 3 wherein said rotary seal ring carrier holds said rotary seal ring in an annular pocket and wherein said system further comprises:

a flow path in said pocket formed between said rotary ring carrier and said rotary seal ring;

at least one hole passing through said rotary seal ring carrier and providing a fluid communication to said flow path adjacent said rotary seal ring, said hole being slanted toward the direction of rotation, whereby gas is drawn toward said rotary seal ring when the rotary seal ring carrier is rotating; and means for venting said gas from said flow path.

5. An active cooling system as claimed in claim 3 wherein said means for venting comprises at least one hole in the outer periphery of said flow pocket.

6. An active cooling system as claimed in claim 4 further comprising an orifice adapted for allowing fluid communication between said apertures and an area between the back of said stationary seal ring and said stationary seal ring carrier.

* * * * *

UNITED STATES PATENT AND TRADEMARK OFFICE
CERTIFICATE OF CORRECTION

PATENT NO. : 5,253,876

DATED : October 19, 1993

INVENTOR(S) : James F. Gardner et al.

It is certified that error appears in the above-identified patent and that said Letters Patent is hereby corrected as shown below:

Claim 1, col. 5, line 13, "sea" should read --seal--.

Claim 5, col. 6, line 26, "claim 3" should read --claim 4--.

Claim 6, col. 6, line 29, "claim 4" should read --claim 3--.

Signed and Sealed this

Twenty-second Day of March, 1994

*Attest:*

BRUCE LEHMAN

*Attesting Officer*    Commissioner of Patents and Trademarks